US 9,336,624 B2

(12) United States Patent
Sullivan et al.

(10) Patent No.: US 9,336,624 B2
(45) Date of Patent: May 10, 2016

(54) METHOD AND SYSTEM FOR RENDERING 3D DISTANCE FIELDS

(75) Inventors: Alan Sullivan, Middleton, MA (US);
Sarah F. Frisken, Cambridge, MA (US);
Ronald N. Perry, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 2287 days.

(21) Appl. No.: 12/246,544

(22) Filed: Oct. 7, 2008

(65) Prior Publication Data

US 2010/0085357 A1   Apr. 8, 2010

(51) Int. Cl.
*G06T 15/00* (2011.01)
*G06T 15/08* (2011.01)
*G06T 15/06* (2011.01)
*G06T 17/00* (2006.01)
*G06T 17/10* (2006.01)
*G06T 17/20* (2006.01)
*G06T 19/00* (2011.01)

(52) U.S. Cl.
CPC ............... *G06T 15/08* (2013.01); *G06T 15/06* (2013.01); *G06T 17/00* (2013.01); *G06T 17/005* (2013.01); *G06T 17/10* (2013.01); *G06T 17/20* (2013.01); *G06T 19/00* (2013.01)

(58) Field of Classification Search
CPC ......... G06T 17/20; G06T 19/00; G06T 17/00; G06T 17/10; G06T 17/005
USPC ......... 345/633, 611, 419, 420, 421, 422, 427, 345/424, 426
See application file for complete search history.

(56) References Cited

U.S. PATENT DOCUMENTS

| 5,926,182 | A | * | 7/1999 | Menon et al. ................ 345/421 |
| 5,926,183 | A | * | 7/1999 | Menon et al. ................ 623/2.41 |
| 6,057,847 | A | * | 5/2000 | Jenkins ........................ 345/422 |
| 6,111,582 | A | * | 8/2000 | Jenkins ........................ 345/421 |
| 6,137,497 | A | * | 10/2000 | Strunk et al. ................ 345/620 |
| 6,396,492 | B1 | * | 5/2002 | Frisken et al. ............... 345/420 |
| 6,509,905 | B2 | * | 1/2003 | Hochmuth et al. .......... 345/619 |
| 6,573,893 | B1 | * | 6/2003 | Naqvi et al. ................. 345/424 |
| 6,597,363 | B1 | * | 7/2003 | Duluk et al. ................. 345/506 |
| 6,771,264 | B1 | * | 8/2004 | Duluk et al. ................. 345/426 |
| 6,940,525 | B2 | * | 9/2005 | Hochmuth et al. .......... 345/619 |
| 7,084,867 | B1 | * | 8/2006 | Ho et al. ...................... 345/419 |
| 7,190,367 | B2 | * | 3/2007 | Perry et al. .................. 345/506 |
| 7,852,336 | B2 | * | 12/2010 | Brown et al. ................ 345/427 |

(Continued)

FOREIGN PATENT DOCUMENTS

| JP | 2000-222603 A | 8/2000 |
| JP | 2001-052196 A | 2/2001 |
| JP | 2001-283251 A | 10/2001 |

*Primary Examiner* — Abderrahim Merouan
(74) *Attorney, Agent, or Firm* — Gennadiy Vinokur; James McAleenan; Hironori Tsukamoto (57) ABSTRACT

A method and system renders a 3D model of a 3D object as an image including image samples. The 3D model is a distance field, and the distance field includes surface cells representing portions of a surface of the 3D object. A set of image samples in the image is determined in an object-order phase for each surface cell. Each surface cell is then processed independent of other surface cells. The processing casts a ray, in an image order phase from each image sample in the set of image samples, through the surface cell to determine a contribution of the surface cell to the image sample, and then the image is rendered.

37 Claims, 10 Drawing Sheets

(56) References Cited

U.S. PATENT DOCUMENTS

| | | | |
|---|---|---|---|
| 2001/0045958 A1* | 11/2001 | Hochmuth et al. | 345/619 |
| 2002/0024517 A1* | 2/2002 | Yamaguchi et al. | 345/424 |
| 2003/0011621 A1* | 1/2003 | Hochmuth et al. | 345/620 |
| 2004/0189662 A1* | 9/2004 | Frisken et al. | 345/611 |
| 2004/0227756 A1* | 11/2004 | Dicken | 345/424 |
| 2007/0071312 A1* | 3/2007 | Gardella et al. | 382/154 |
| 2007/0165035 A1* | 7/2007 | Duluk et al. | 345/506 |
| 2008/0259079 A1* | 10/2008 | Boxman et al. | 345/424 |

* cited by examiner

METHOD AND SYSTEM FOR RENDERING 3D DISTANCE FIELDS

FIELD OF THE INVENTION

This invention relates generally to the field of computer graphics and to rendering 3D models of 3D objects, and more particularly to rendering the 3D models of the 3D objects where the 3D models are represented as 3D distance fields, and used to simulate the results of computer numerically controlled (CNC) machining operations.

BACKGROUND OF THE INVENTION

Distance Fields

In computer graphics applications, a three-dimensional (3D) object can be represented using a number of different methods, e.g., methods that use polygonal models, point cloud models, parametric functions, or implicit functions.

One class of methods uses a distance field that specifies a minimum distance $d(x)$ from any location $x=(x, y, z)$ in 3D space to a surface of the object. The distance field $d(x)$ can distinguish the inside, the outside and the surface of the object, e.g., $d(x)<0$ is outside, $d(x)>0$ is inside, and $d(x)=0$ is on the surface of the object.

Furthermore, the distance field can be used to locate surfaces that are offset from the actual surface of the object, i.e., offset from $d(x)=0$. In general, the surface criterion is defined as $d(x)=c$, where c is a constant distance offset from the object's surface and may be equal to 0. Alternately, a new offset distance field $D(x)=d(x)-c$ can be used such that the offset surface satisfies the condition that $D(x)=0$. It is to be understood throughout this description that the offset distance field can he used in place of the actual distance field without loss of generality.

The distance field of an object can be specified by a number of different means. For simple geometric objects, the distance field can be specified analytically. For example, the distance field of a sphere of radius R centered at 3D coordinates $(x_0, y_0, z_0)$ can be written as $d(x)=R-\sqrt{[(x-x_0)^2+(y-y_0)^2+(z-z_0)^2]}$. In this case, the parameters R and $(x_0, y_0, z_0)$, in combination with the distance function of the sphere, are sufficient to fully specify the distance field and hence the 3D shape of the object. In general, a 3D distance field can be specified by a set of parameters $p=\{p_0, p_1 \ldots p_n\}$ and a distance function $f(x, y, z, p_0, p_1 \ldots p_n)$.

The distance function f can be a combination of other functions. For example, the object may be a composite object formed by the UNION of two objects, such as a sphere and a cube. In this case a point in 3D space x is inside the surface of the composite object if $d_{sphere}(x)>0$ OR if $d_{cube}(x)>0$, where OR is the Boolean OR function. This combination of objects by the Boolean operations, UNION, INTERSECTION, and DIFFERENCE, is well known in the art as constructive solid geometry (CSG).

For some applications of distance fields, such as computer simulation, it may be useful to compute and store in memory, i.e., sample, the distance field at an array of locations in 3D space. Although distance field sampling on a regular 3D grid has the benefit of simplicity, the spatial sampling rate needs to be high enough to capture the highest spatial frequencies present in Additionally, it may be useful to partition the 3D space into regions in which different distance functions and/or parameters are used in different regions. For example, the distance function may be that of a sphere in a region of space that extends from $(x_a, y_a, z_a)$ to $(x_b, y_b, z_b)$, while the distance function may be that of the cube in a region of space that extends from $(x_c, y_c, z_c)$ to $(x_d, y_d, z_d)$. Herein, these regions of space are defined as cells with the coordinates of the corners of the cells as vertices.

Space-partitioning may be done by many means. It may be useful to use cells that are rectangular or cubic in shape, but other arbitrary cell shapes can be used without a loss of generality. Additionally, it may be useful to organize the cells into a data structure, such as a tree, to enable locating cells having specific spatial relationships. For example, the cells may be cubic and be arranged in simple cubic grid, or in an octree data structure. Alternately, the cells may be rectangular and arranged in a k-dimensional tree structure.

For some applications of distance fields, such as computer simulation, it may be useful to compute and store in memory, i.e., sample, the distance field at an array of locations in 3D space. Although distance field sampling on a regular 3D grid has the benefit of simplicity, the spatial sampling rate needs to be high enough to capture the highest spatial frequencies present in the surface of the object. However, only in extreme cases do these high frequencies exist everywhere on the surface. More typically, the surface includes smooth portions, which could be sampled at lower rates without loss of detail.

In a 3D adaptively sampled distance field (ADF), the distance field is sampled at a spatial frequency that varies in space in proportion to a local level of detail of the surface of the object. Portions of the surface of the object with a large amount of spatial detail are sampled at a higher frequency than areas of low detail, e.g., smooth portions of the surface, in this way, the amount of memory used to store the shape of the object is minimized, while the spatial details are preserved at high resolutions. Typically, the 3D distance field is sampled on the vertices of a cell and stored hierarchically as an octree of cells, wherein the cells are recursively partitioned according to the level of detail.

In the same way as described previously, the value of the distance field at an arbitrary location in 3D space can be computed from the distance field samples. In this case, the distance field samples are the parameters of the distance function and the distance function is a function for reconstructing the distance field from the distance field samples, also know as a reconstruction kernel. For example, the distance field can be computed from the distance field samples at the vertices of the cell by tri-linear interpolation. However, tri-quadratic interpolation, vector distance field interpolation or other reconstruction kernels can also be used. Additionally, the reconstruction kernel provides a means for computing the gradient of the distance field at any point in space. For points that lie on or near the surface of the object, the gradient points in the same direction as the surface normal.

Rendering

In the prior art, 3D ADFs have been rendered by three classes of methods: point rendering, image-order ray casting, and object-order polygonal rendering, see U.S. Pat. No. 6,396,492 "Detail-directed hierarchical distance fields," issued to Frisken et al. on May 28, 2002, incorporated herein by reference.

Point Rendering

Point rendering of distance fields is achieved by starting from a set of points in the 3D space of the object. The distance field and its gradient vector are computed at each point and then the points are iteratively modified by moving them along the gradient vector in the direction of the surface. Motion ceases once the points reach the surface of the object to within a specified level of accuracy.

Once an array of surface points is found they can then be rendered by a number of means. For example, very simply single pixel primitives (i.e. GL_POINT) can be rendered using the OpenGL graphics API. Alternatively, an extended primitive, sometimes called a sprite or splat, can be rendered at each location.

Point rendering has the advantage of simplicity and can be quite fast. However, it can be difficult to create images without holes. Uniform coverage of the surface with points is not guaranteed and considerable effort is required to identify and fill in missing regions.

Image Order Ray Casting

Image-order ray casting methods determine pixel color and brightness in an output image on an individual pixel basis. A ray is cast from each pixel in the image through the distance field. The ray is followed from cell-to-cell until the surface is found.

As an advantage, ray casting can be as accurate as the 3D ADF, e.g., 1 part in $10^6$ or greater. The process of identifying surface cells in the octree that contain the surface along the direction of the cast ray is fairly simple, but can be very inefficient in terms of computer memory accesses. The data associated with spatially adjacent cells in the octree are often widely separated in computer memory, resulting in a high rate of CPU memory cache misses, which degrades the overall performance of the rendering method.

When the data required for casting rays through a cell are not in the CPU cache as needed, the rendering update rate is severely decreased, sometimes to the point that interactive rendering while manipulating the model at real-time rates, e.g., ten updates per second, is impossible.

Object Order Polygonal Rendering

Object order polygonal rendering of the 3D ADF requires a polygonal representation of the ADF. Various methods for generating the polygon model from the ADF are known, including marching cubes and surface nets.

In general, object-order rendering determines the set of pixels in the image affected by each a polygon independent from any other polygon. It is common to use a z-buffer to properly combine these independent contributions, although other means are known, e.g. the painters algorithm or priority fill, wherein polygons are first sorted in a depth order prior to rendering.

Because polygon models dominate computer graphics, a large variety of polygon rendering hardware and software is available, e.g., Microsoft Direct3D and Silicon Graphic OpenGL. After the polygonal model is generated, it can be rendered to an image at a rate that is generally much higher than is possible for image-order ray casting.

However, the polygon representation uses flat primitives, and is only an approximation of the ADF. This results in images that are more faceted in appearance, and therefore cannot accurately represent curved surfaces. This is a particular problem when the rendering must be highly accurate, e.g., accurate to one part in a $10^6$. With polygon rendering, it may be necessary to employ an unmanageably large number of very small polygons to produce surface images that are very smooth resulting in extreme memory and/or processing requirements.

Cracks in Rendered Images

In spatial partitioning methods, such as ADFs, adjacent cells can have different sizes depending on the local level of detail. As a result, the surface reconstructed from the distance field samples of one cell may not exactly match the surface reconstructed from the distance field samples of an adjacent cell resulting in the appearance of cracks in the rendered image.

It is desired to provide a method for rendering the surface represented by the 3D distance field that has the accuracy of ray casting, and the speed of polygon rendering. Additionally, it is desired that this method for rendering produces images without any crack artifacts.

It is also desired to provide a simulation that can be incorporated into manufacturing operations such as performed by milling and other machine tools. Such a simulation would enable the operator to visually identify mistakes in the machining process before the part is actually machined, thereby saving time and possibly materials.

SUMMARY OF THE INVENTION

A method and system renders a 3D model of a 3D object as an image including image samples. The 3D model is a distance field, and the distance field includes surface cells representing portions of a surface of the 3D object.

A set of image samples in the image is determined in an object-order phase for each surface cell. Each surface cell is then processed independent of other surface cells.

The processing casts a ray, in an image order phase from each image sample in the set of image samples, through the surface cell to determine a contribution of the surface cell to the image sample, and then the image is rendered.

DETAILED DESCRIPTION OF THE PREFERRED EMBODIMENT

Method and System Overview

Figure 1A:
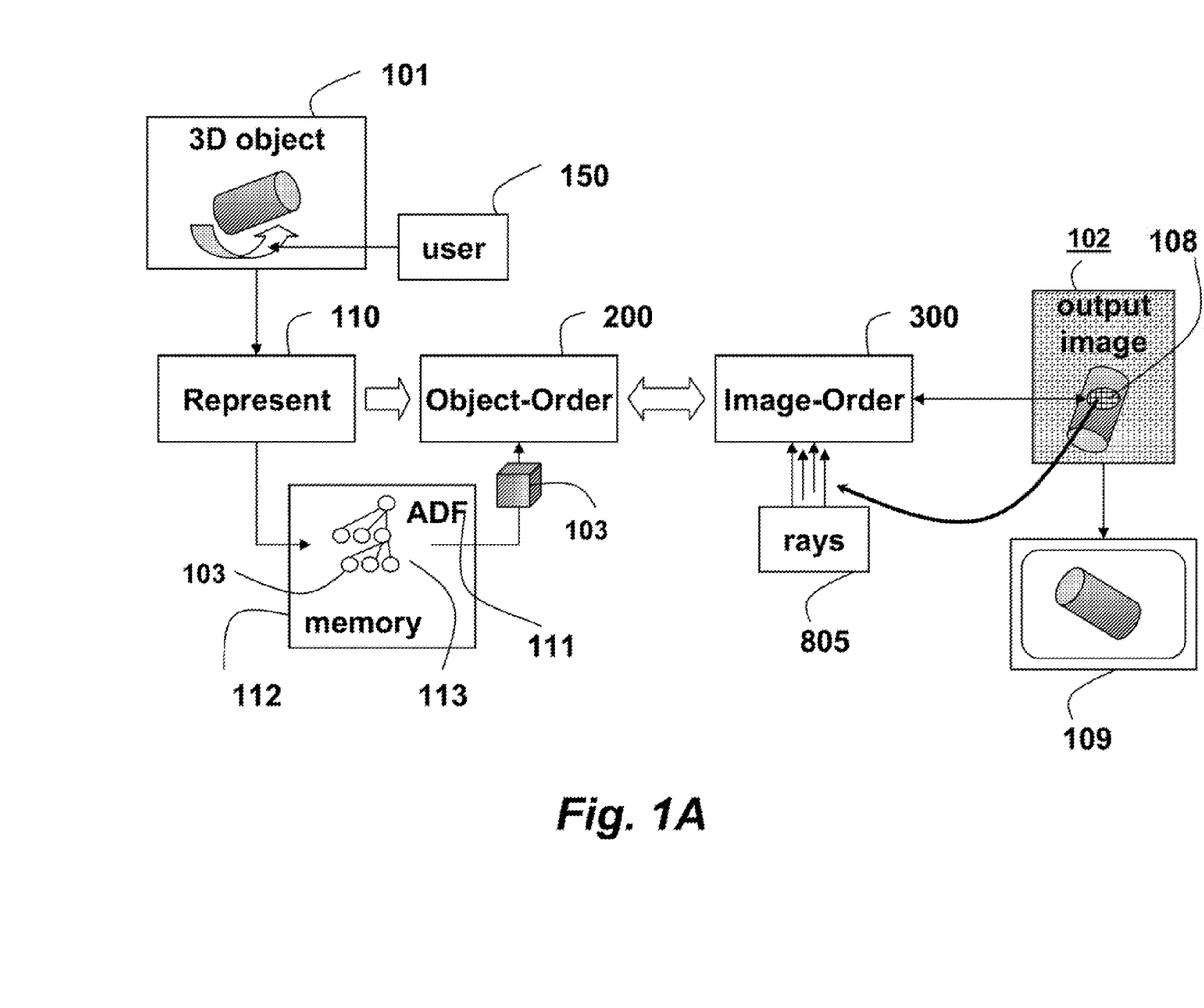
FIG. 1A is a flow diagram of a method for rendering a 3D model of a 3D object according to embodiments of the invention.
Figure 1B:
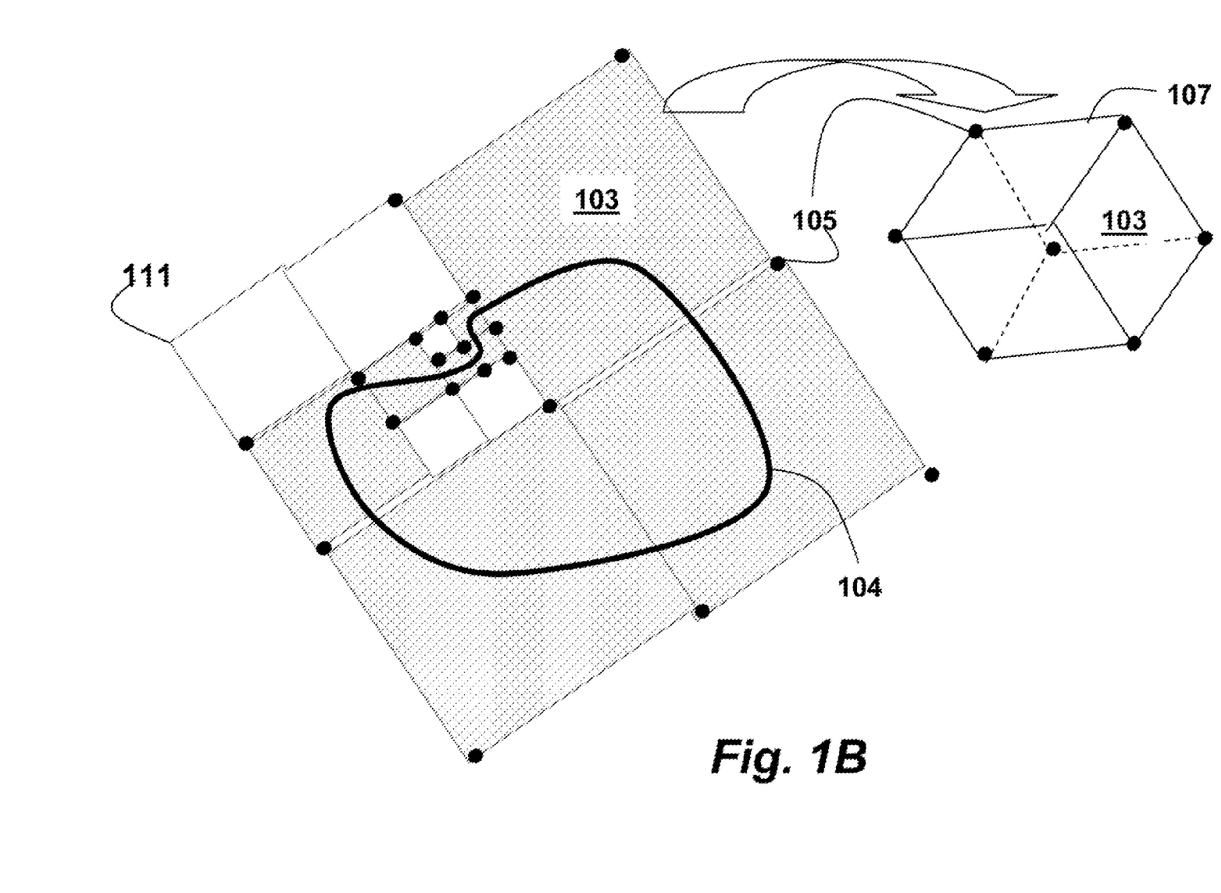
FIG. 1B is a 2D schematic of an adaptively sample distance field (ADF) according to an embodiment of the invention.
Figure 9:
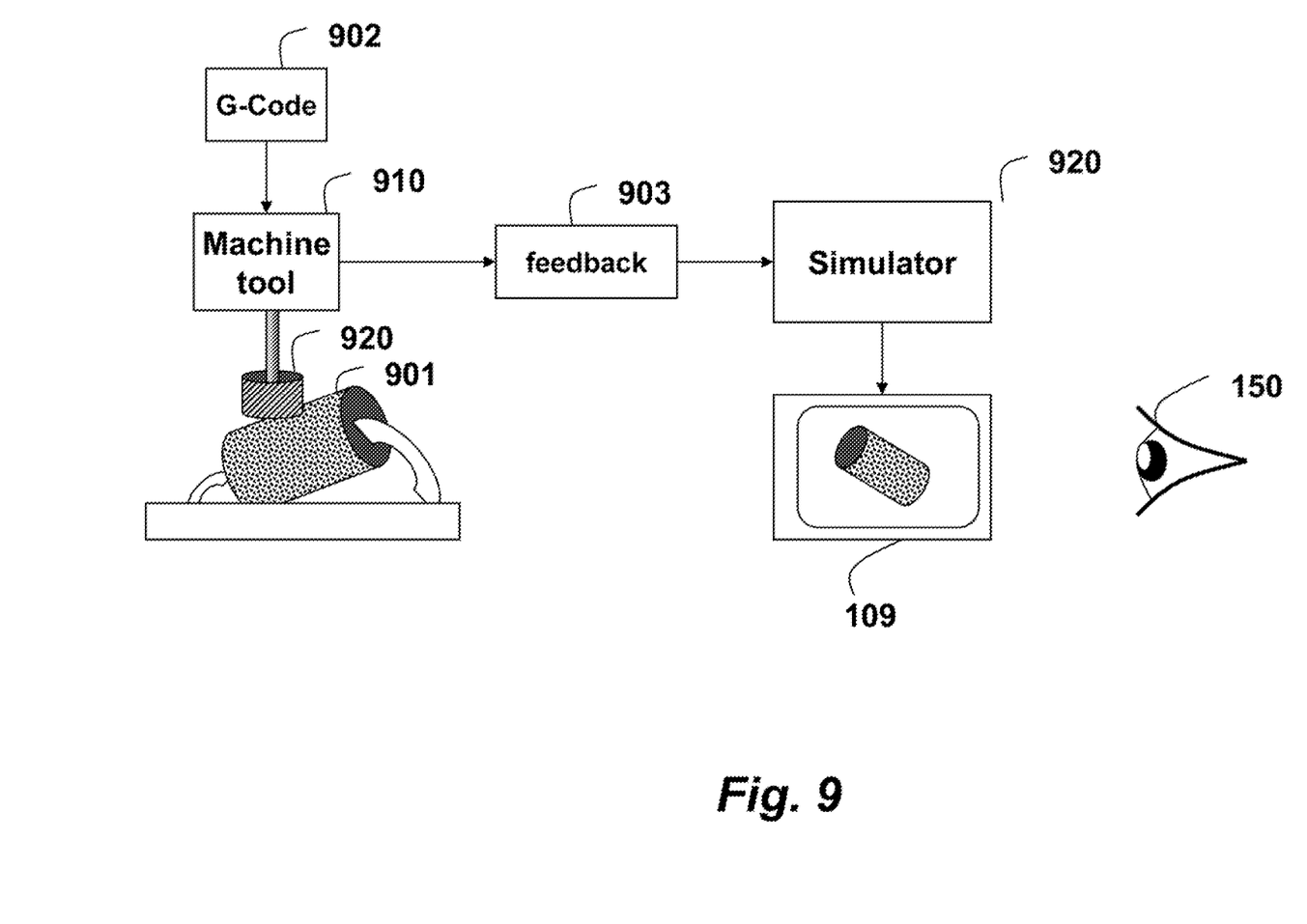
FIG. 9 shows a system for simulating a machining tool according to embodiments of the invention.

As shown in FIGS. 1A-1B, the embodiments of our invention provide a method for rendering a 3D model 111 of a 3D object 101 as an output image 102. The rendering can be to a display or print device 109, or a memory. FIG. 1A shows the method and FIG. 1B shows a cell-based data structure. The rendering can simulate machining operations such as performed by a milling machine, as shown in FIG. 9.

In one embodiment of the invention, the model represents the object as a 3D adaptively sampled distance field (ADF) stored in a memory 112 of a computer system as an octree 113. However, in general, the model can be any distance field structurally represented as a space partitioning data structure, for example a k-dimensional tree, or an octree. Additionally, the distance field can be reconstructed from distance field samples, or determined analytically by, for example, a continuous function.

When the distance field is stored in an octree data structure, the octree includes three types of cells: root, intermediate and boundary cells. The boundary cells can either be interior, exterior or surface cells (stippled in FIG. 1B) 103. One object of the invention is to minimize the number of cells that are processed. Hence, the processing as described herein is primarily concerned with the surface cells. It should be noted that the invention can work with any object representation that partitions the model into surface cells expressed in object space, and where the surface cells are projected to image samples (pixel) regions in window coordinates.

The surface cells represent the entire surface 104 of the object. In tri-linear distance fields, the distance field is sampled at the eight vertices (corners) 105 of the surface cells. In the surface cells, the distance field samples at the location of at least two vertices have opposite signs because the surface, where the distance field d(x) equals zero, passes through the cell.

It is understood in the art that the extent of the surface cell in 3D space is called the bounding box 107.

Hybrid Object/Image-Order Rendering

As one advantage over prior art methods, our rendering method combines the accuracy of conventional ray casting with the speed of polygon rendering in a hybrid rendering method. During the rendering, each surface cell 103 of the distance field is first processed in an object-order phase 200, and then in an image-order phase 300.

During the object-order phase 200, we determine independently for each surface cell 103 a set of image samples 108 in the output image 102 that correspond to a portion of the surface 104 in the surface cell. As stated above this is done by projecting the surface cells to window coordinates.

During the subsequent image-order phase 300, rays 805 are cast from each image sample in the set 108 to determine contribution of the portion of the surface to that image sample independent of other surface cells. This is done by transforming the ray parameters from window coordinates to cell coordinates.

As known in the art, a z-buffer (sometimes known as a depth-buffer) is used to combine the contributions of the individual surface cells to the images samples in the output image. In this way, each surface cell is processed only once for each step in our rendering method.

Finally, the image samples are converted to image pixels for display. In the simplest implementation image samples can have a direct 1-to-1 correspondence to image pixels. However, other conversions from images samples to image pixels may be employed. For example, the image may be super-sampled wherein many image samples correspond to a single image pixel. The image samples can be averaged together for the purpose of eliminating so-called aliasing artifacts in the final image. Alternately, the image may be sub-sampled, or sampled such that there are fewer image samples than image pixels. The image samples can then be processed to generate the image pixels. In general, sub-sampling requires less computation than direct sampling thereby increasing the rendering speed and associated interactively. In general the image samples, for various reasons can have a different resolution than the actual pixels in the eventual image that is displayed.

Surprisingly, the performance of our rendering method is about an order of magnitude faster than conventional distance field ray casting methods without degrading accuracy, and is comparable in speed with conventional polygonal rendering methods. Even more surprisingly, the performance advantage of our method over polygonal rendering increases for more complex objects where the overhead of generating the intermediate polygon model becomes greater.

As another advantage, the method includes a procedure for eliminating "cracks" that is common in some distance field-based rendering methods.

Coordinate Systems

Figure 4:
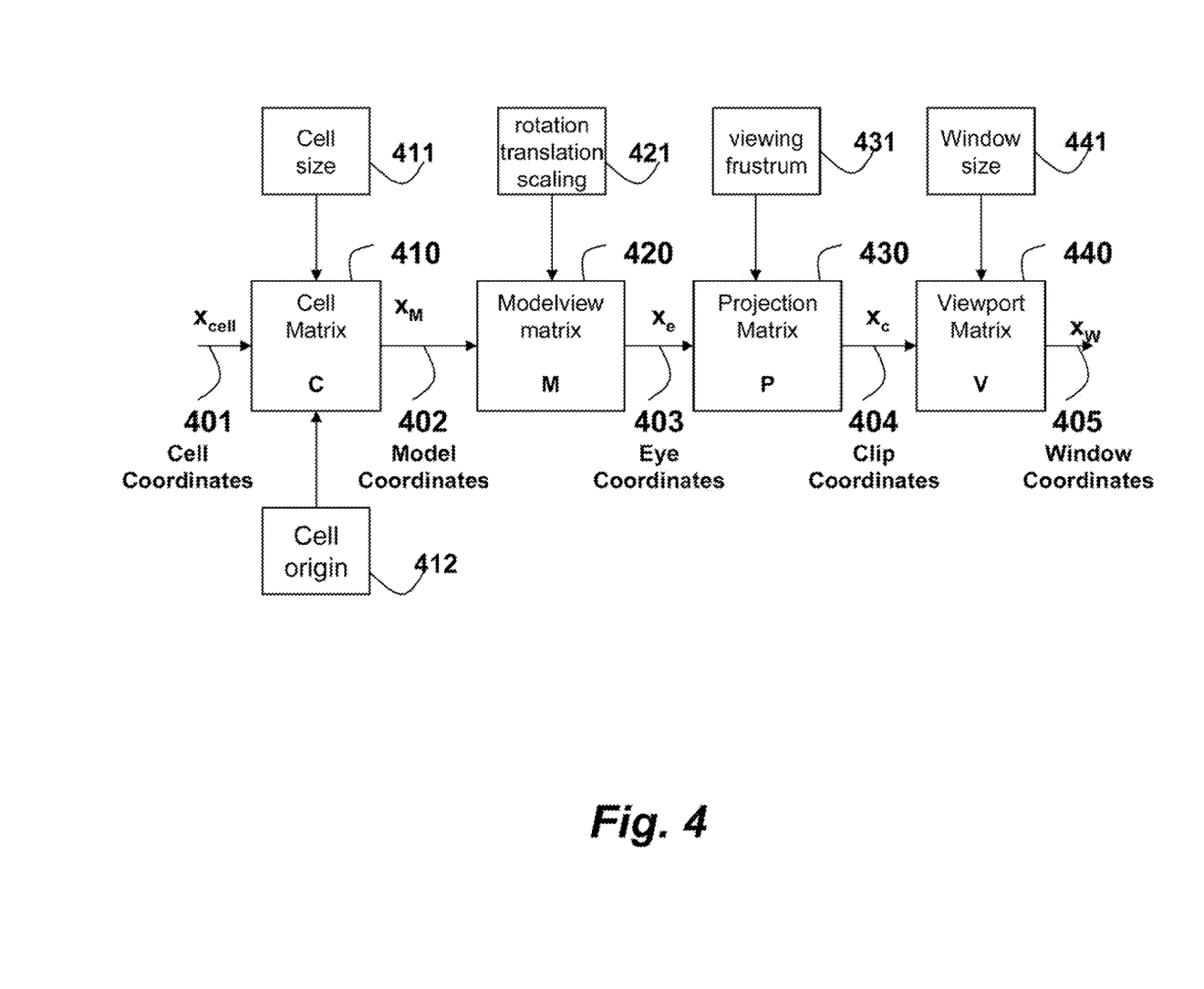
FIG. 4 is a flow diagram of transformations according to embodiment of the invention.
Figure 5:
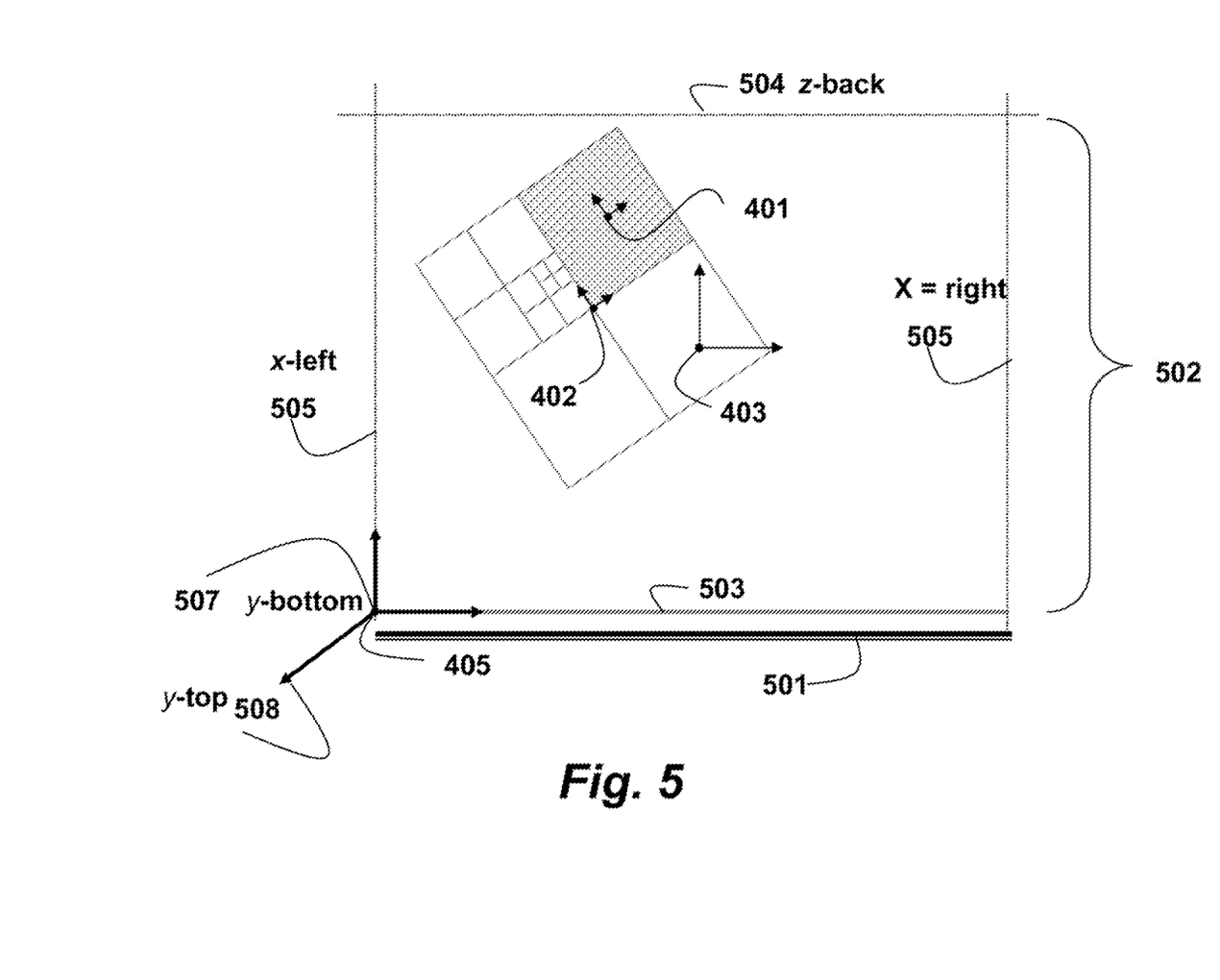
FIG. 5 is a top-down schematic of the ADF and rendering parameters according to embodiment of the invention.

As shown in FIGS. 4-5 and is common in 3D computer graphics, our rendering method uses multiple coordinate systems that are related by linear transformations. Our coordinate systems are partially based on the Open Graphics Library (OpenGL) standard specification. The coordinate systems include cell coordinates, $x_{cell}$ 401, model coordinates, $x_m$ 402, eye coordinates, $x_e$ 403, clip coordinates, $x_c$ 404, and window coordinates, $x_w$ 405.

In general, the transformation of coordinates x in one coordinate system to coordinates x' in another coordinate system involves multiplication by a matrix, e.g., $x'=Ax^T$, where $x^T$ is a column vector and A is a generic transformation matrix. Transformations from cell coordinates to model coordinates use a cell matrix C 410, transformations from model coordinates to eye coordinates use a modelview matrix M 420, transformations from eye coordinates to clip coordinates use a projection matrix P 430, and transformations from clip coordinates to window coordinates use a viewport matrix V 440.

FIG. 5 also shows a top-down view (y-dimension) of a viewing window 501, and a viewing frustrum 502, bounded by z-front 503, z-back 504, x-left 505, x-right 506. The viewing frustum is additionally bounded by y-bottom 507 and y-top 508, which are orthogonal to the view shown.

The components of a 3D location in cell coordinates $x_{cell}=(x, y, z, 1)$ range over the interval [0, 1]. The cell coordinates are transformed to model coordinates $x_m$ by the cell matrix $$C = \begin{pmatrix} C_S & 0 & 0 & C_{Ox} \\ 0 & C_S & 0 & C_{Oy} \\ 0 & 0 & C_S & C_{Oz} \\ 0 & 0 & 0 & 1 \end{pmatrix},$$

where $C_S$ is a size 411 of the surface cell, and $C_O$ are the coordinates of the origin 412 of the surface cell in the model coordinates. In a distance field that is adaptively sampled and stored in an octree, it is common for the origin of the root (level 0) cell of the ADF to coincide with the origin 402 in model coordinate system.

The model coordinates are transformed to the eye coordinates by the modelview matrix M. The modelview matrix specifies the rotation, translation, and scaling 421 of the model. Typically, a user 150 manipulates and views the model interactively by changing the modelview matrix.

The eye coordinates are transformed 430 to the clip coordinates by the projection matrix P. The projection matrix uses the size 431 of the viewing frustrum 502. The viewing frustum defines the portion of the model that appears in the output image. As an example, the projection matrix can represent an orthographic projection or perspective projection.

The clip coordinates of visible portions of the object lie in a unit cube (−1, −1, −1) to (1, 1, 1). Any portion of the object outside of the unit cube is not visible in the output image. One goal of the invention is to minimize the processing of such portions.

The clip coordinates are transformed into window coordinates by the viewport matrix V. The viewport matrix depends on a size (width and height) 441 of the output image 102.

It is understood by those skilled in the art that the aforementioned transformations from cell coordinates to image pixels are just one possible set of transformations that can be employed. In general any set of transformations, both linear and non-linear, can be used to map from cell coordinates to image coordinates.

Rendering

For the purposes of rendering, the only cells of importance are the surface cells 103. These are the only cells that contain the surface of the object. In the octree hierarchy 113, a cell at any level can be a surface cell, provided the cell represents a portion of the surface of the object.

The rendering process needs the coordinates of the origin 402 of the surface cell, the size 411 of the cell, and the distance values d(x). The distances values can be obtained analytically or by sampling. Because the cells in an octree are cubic, the three dimensions of each cell are equal, and the origin and size are sufficient to specify the cell coordinates of the vertices of the cell. For a tri-linear reconstruction, there are eight sampled distance field values, while twenty-seven values are needed for tri-quadratic reconstruction.

The rendering also needs the color of the surface, and the color and locations of light sources, using the model coordinates.

The performance of the rendering process is improved by eliminating unneeded computations as described below.

Object-Order Phase

Figure 2:
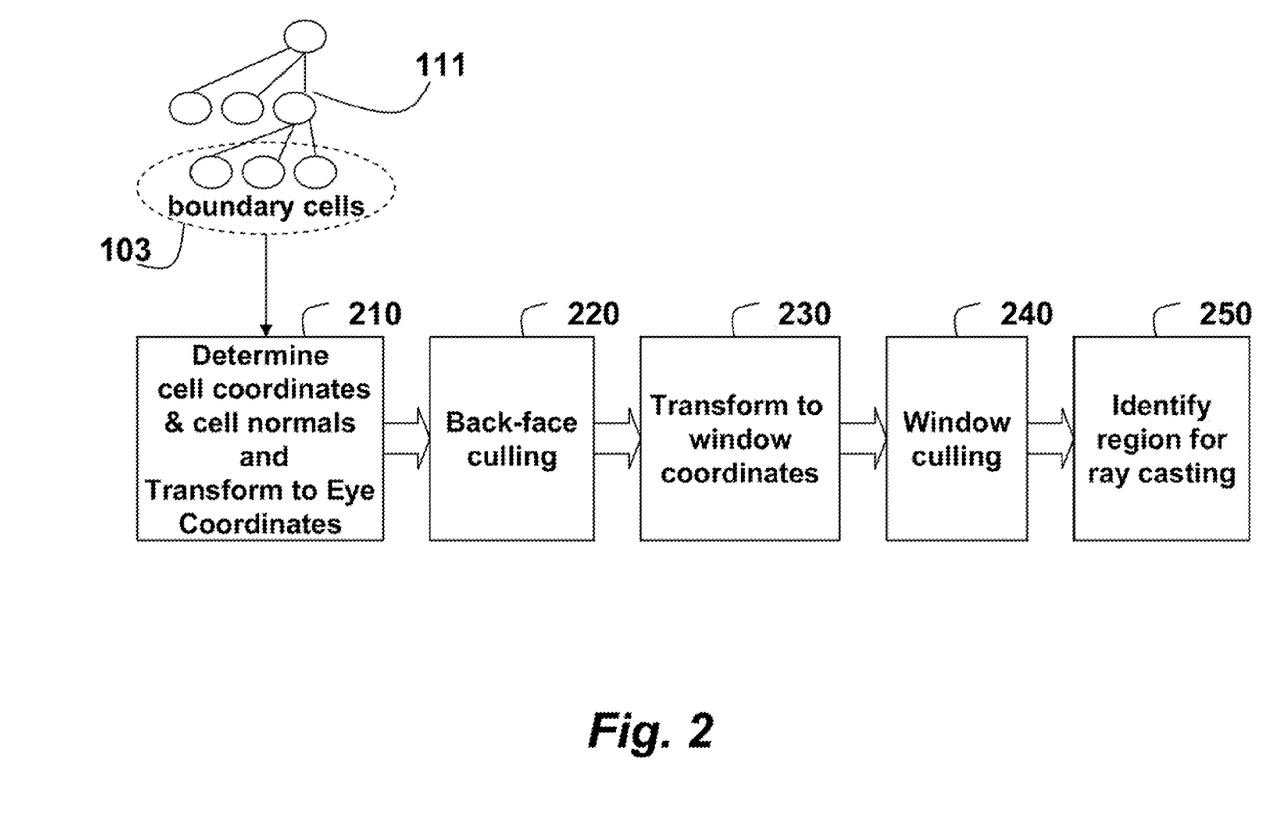
FIG. 2 is a flow diagram of an object order phase of the method of FIG. 1 according to embodiments of the invention.

During the object-order phase 200, the coordinates of the vertices of surface cells 103 of the distance field 111 and the surface normals of the surface within the surface cell are transformed 210 from model coordinates to eye coordinates. Back-face culling 220 identifies portions of the surface of the object that will be visible in the output image. Using the modelview, projection, and viewport matrices M 420, P 430, and V 440, the cell coordinates are transformed to window coordinates 405, and window culling is applied 240 to identify 250 the window region for ray casting in the image-order phase 300.

Back Face Culling

The only portions of the surface that are visible are unoccluded portions of the surface whose normals point generally in the viewing direction. Surface cells that represent back facing portions of the surface of the object do not need to be processed as the portion of the surface they contain is not visible. Depending on the exact surface representation, a number of means are available to determine the orientation of the surface within a cell. Analytic means for determining a range of surface normals within a cell can be employed. Alternately, the range of normals can be pre-computed when the distance field is generated or edited. For example, the rendering method can be provided with a normal cone that indicates limits of the surface normals within the cell.

Alternately, in a sampled distance field that uses a trilinear reconstruction kernel, the range of surface normals can be bounded by the values at the vertices 105 of the cell. Therefore, the range of surface normals can be determined from the normal at each vertex of the cell.

To determine the orientation of the surface, coordinates of the normals are transformed from the object coordinates to the eye coordinates by multiplication with a transposed inverse of a modelview transformation, $(M^{-1})^T$. Then, the dot product between the transformed normal and the viewing direction is determined. If the dot product for the normals at all vertices is less than zero, then the portion of the surface within the cell is back facing, and no further processing of that cell is needed.

Window Culling

In object-order rendering of the distance field, it is necessary to determine the set of image samples in the output image that is affected by the portion of the surface contained within a cell. The only portions of the surface that are visible are those within the viewing window 501 of the output image. Any portions outside the viewing window cannot be seen and do not need to be processed. Therefore, performance can be improved by eliminating the processing of cells containing portions of the surface not within this window.

Figure 6A:
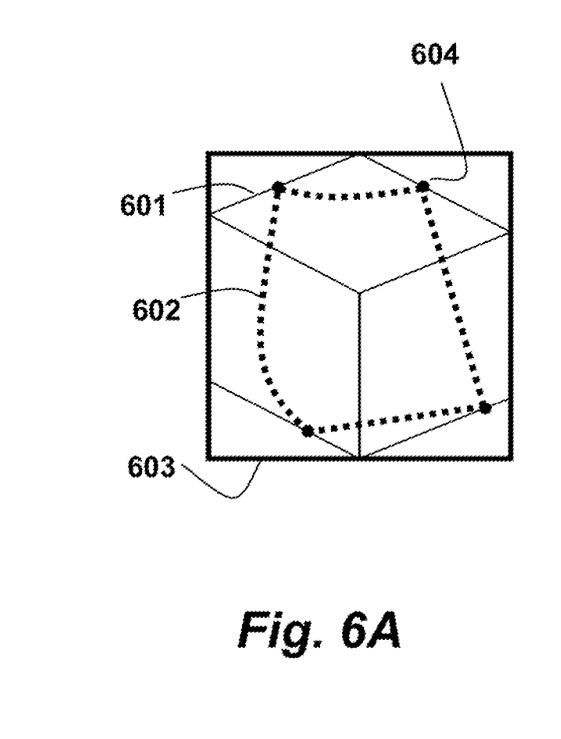
FIGS. 6A-6C are schematics of convex hulls and region growing according to embodiment of the invention.

In one procedure for determining the set of affected image samples, we determine the projection of the bounding box 601 of the cell containing a portion of the surface 602 onto the output image by transforming the model coordinates of the vertices of bounding box by the modelview, perspective and viewport transformations. A rectangle 603 drawn around the limits of a projection of the bounding box can then be used to define the set of image samples for rendering. This is a conservative approach because, by definition, the surface does not extend beyond the bounding box.

However, the preceding procedure may not be very efficient because many image samples within the region of the projection of the bounding box 603 are outside the projection of the surface 602. Therefore, many rays do not intersect the surface.

Figure 6B:
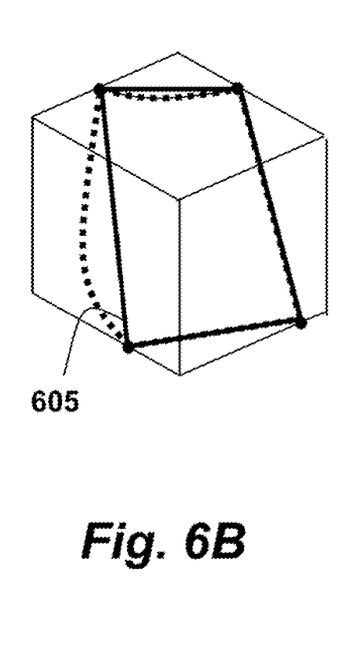

Another procedure uses the coordinates of points 604 where the edges of the surface cell and the surface intersect to define the rendering region. In our distance field with signed distance values, a change of the sign of the sampled distances d between two adjacent vertices indicates that the surface intersects the edge of the cell between the vertices.

For all of the edges of the cell, the coordinates of the point of intersection 604, if any, can be determined. A convex hull, 605, which bounds the region containing the surface in the output image, can be determined from the window coordinates of the intersection coordinates. While the convex hull minimizes the number image samples from which rays are cast, the process of determining which image samples are within the hull is still computational demanding.

Figure 6C:
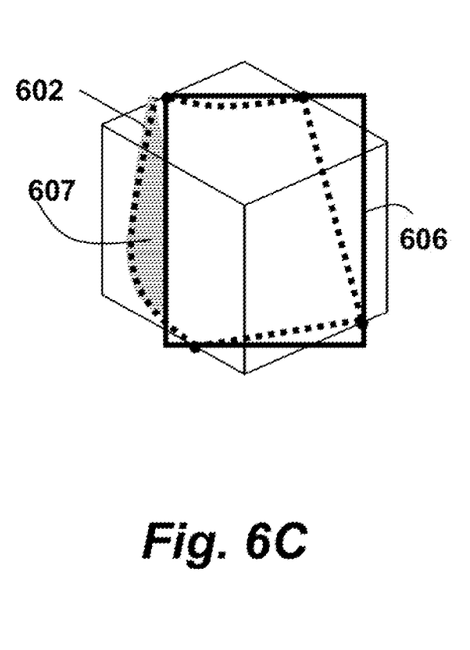

Alternately, as shown in FIG. 6C, we can define a rectangular image region 606 by locating a minimum and maximum of the window coordinates (x, y) of the points of intersection between the surface and the edge of the surface cell. This can dramatically improve performance compared to using the procedure that uses a projection of the bounding box.

The coordinates of the point of intersection are transformed into clip coordinates and compared with a range [−1, 1]. If none of the transformed intersection coordinates are within this range, then no portion of the surface is visible and further processing of the cell is not needed. Otherwise, the intersection coordinates are clamped to lie within this range and are transformed into the window coordinates.

Region Growing

As shown in FIG. 6C, the intersection based procedure can under estimate the true extent of the screen projection of the surface within the cell. For example, the surface represented by the cell may be curved so that a part 607 extends outside the region 606 determined from edge/surface intersections along one or more region boundaries. If this is not corrected, the output image will have 'holes'.

To avoid this problem, we require that there are no visible image samples along the boundaries of the image region. If during the subsequent ray casting it is determined that some portion of the surface intersects the boundary of the image region, then rays are cast from additional rows or columns in the part 607 outside the region boundary in an appropriate direction. In effect, we add adjacent image samples to the set of image samples for the cell as long as the rays cast from the adjacent image samples intersect the surface. This region growing process continues until the above boundary criterion is met. It should be noted that other regions growing methods, such as seeded region growing, could be used.

Image-Order Phase

Figure 3:
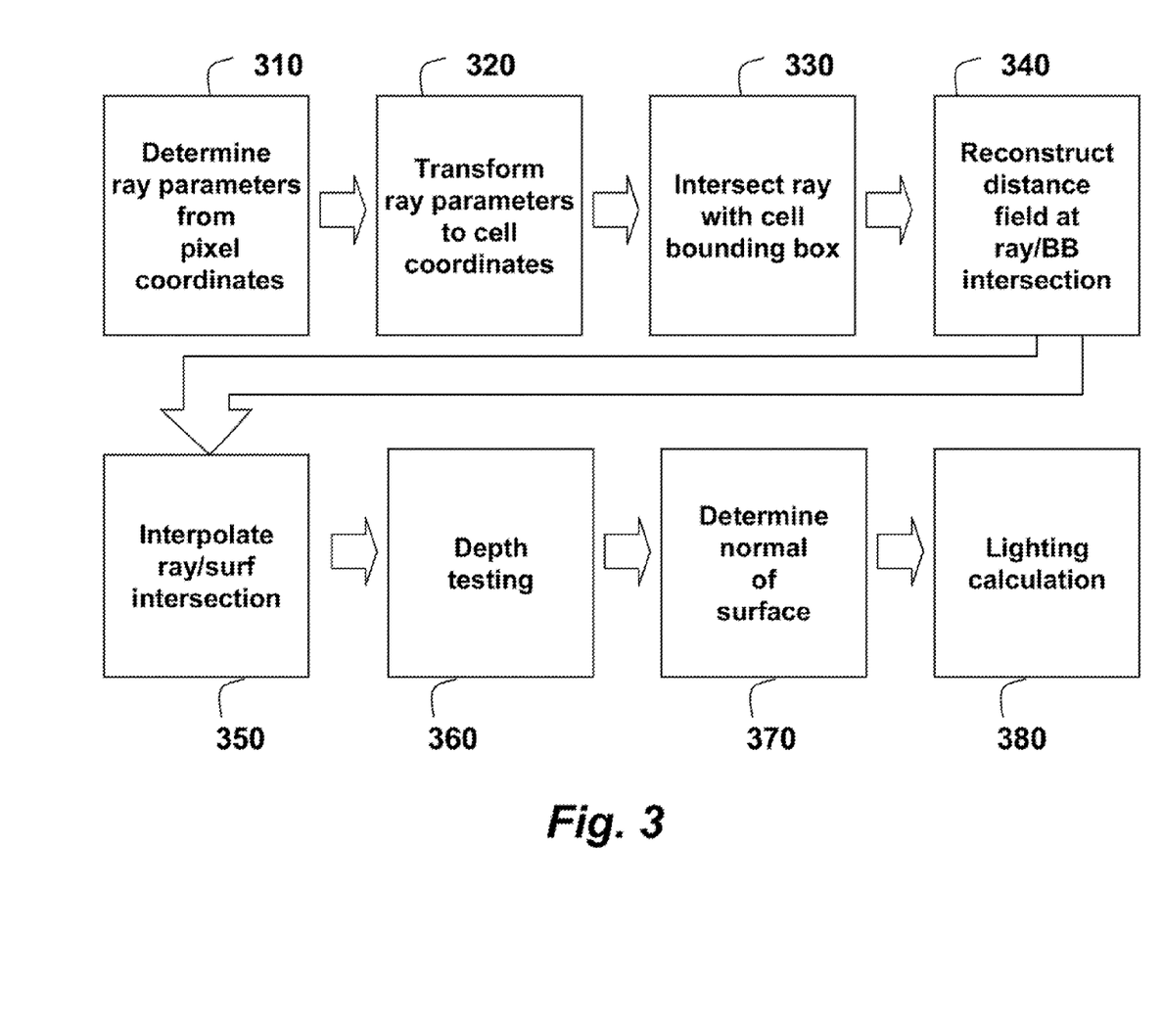
FIG. 3 is a flow diagram of an image order phase of the method of FIG. 1 according to embodiments of the invention.

During the image-order phase 300 as shown in FIG. 3, rays are cast from the image samples in the output image 102 through the model 111. Step 310 determines the ray parameters from window coordinates of the image samples in the output image. The ray parameters specify an origin and a direction of each ray. The ray parameters are transformed 320 to cell coordinates. The ray is intersected 330 with the bounding box of each surface cell. The distance field is reconstructed 340 at the points of intersection.

The point of intersection of the ray with the surface of the object within the surface cell is interpolated 350 from the reconstructed distance field at the bounding box intersection points.

For rays that intersect the surface, the z-buffer is used for depth testing 360. Surface normals are determined 370 for lighting calculations 380.

Ray Casting

Figure 7A:
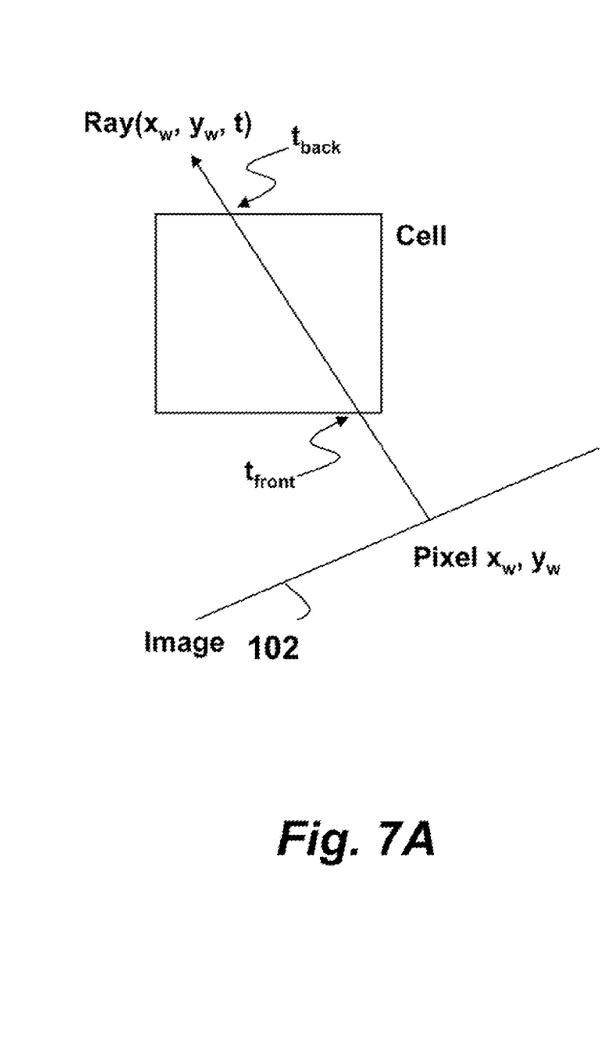
FIGS. 7A-7B of ray casting according to embodiments of the invention.
Figure 7B:
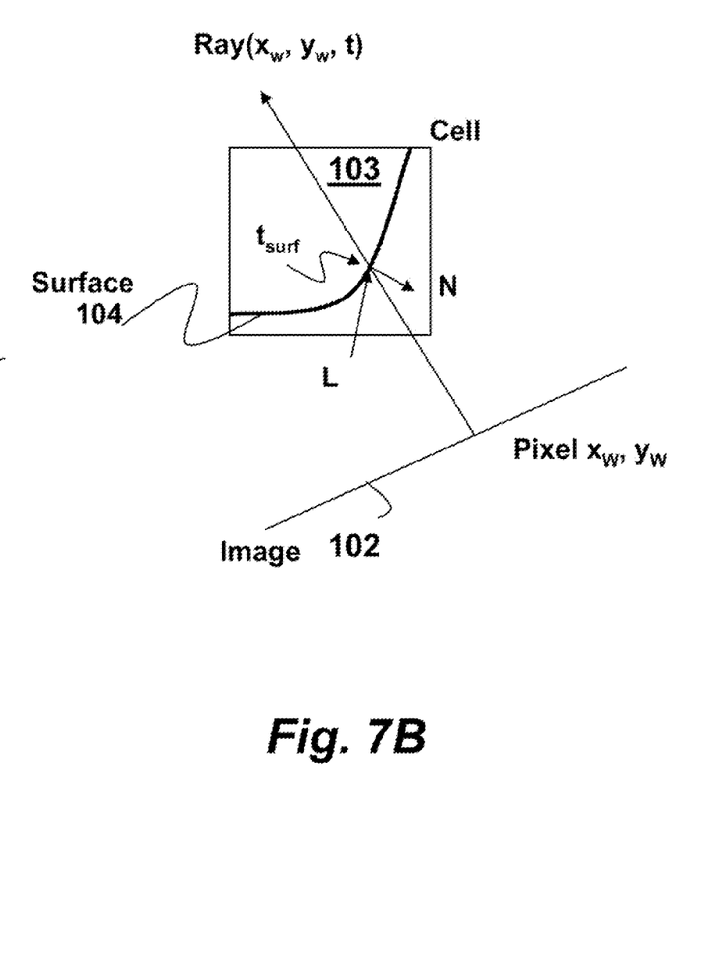

After the screen region 606 has been determined and as shown in FIGS. 7A-7B, the rays are cast from the image samples in an image sampling order, wherein the image sampling order may be for example in increasing x, then increasing y order. However, any order may be used without loss of generality. The rays are processed in an image order. The rays originate in window coordinates from image sample coordinates $R_o=(x_w, y_w, 0)$ in the viewing window and in the direction $R_d$, which can be, for example, in the general $-z$ direction. The parameterized ray equation is $R(t)=R_o+t R_d$, where t is a ray propagation parameter.

A direction vector $R_d$ can be a unit vector, i.e., $|R_d|=1$. Alternatively, another length can be used. For example, if orthographic projection is used, with near and far values of N and F for the viewing frustum, respectively, then using a ray direction vector with length $|R_d|=F-N$ results in the ray parameter t being in the range of [0,1], i.e., the same range employed in a conventional OpenGL z-buffer. Therefore, the parameter t can be treated as the depth of the ray in window coordinates.

Ray surface intersection can be efficiently performed in cell coordinates 401. Therefore, the ray origin and ray direction are transformed from window coordinates to cell coordinates by multiplying by inverse matrices $C^{-1}M^{-1}P^{-1}V^{-1}$. Then, the ray parameters $t_{front}$ and $t_{back}$ at front and back intersection respectively of the ray with the axis aligned bounding box are determined conventionally. If $t_{front}>t_{back}$, then the ray misses the bounding box and cannot intersect the surface, and no further image sample processing is needed, and processing proceeds with the next image sample. If the ray intersects the bounding box, then the coordinates of the front and back intersection, $R(t_{front})$ and $R(t_{back})$ respectively, are computed from the ray equation.

The distance fields $d_f=d(R(t_{front}))$ and $d_b=d(R(t_{back}))$ are interpolated at the front and back intersection coordinates, respectively, using the reconstruction kernel. If $d_f \leq 0$ and $d_b \geq 0$, that is the front intersection point is outside the surface and the back intersection point is inside the surface, then the ray intersects the surface. Otherwise, processing proceeds with the next image sample. A ray with $d_f<0$ and $d_b<0$ is completely outside the surface, while a ray with $d_f>0$ and $d_b>0$ is completely inside the surface.

A number of methods may be employed to find the coordinates of the ray/surface intersection. It may be possible, for certain distance field representations, to find a closed form analytic solution for the ray parameter at the point of intersection of the ray and surface. Alternately an iterative procedure, such as a Newton-Raphson approximation, can be used. To obtain a good starting point for the iterative procedure, we can use a linear approximation for the distance field interpolation $d(t')=d_f+t'(d_b-d_f)$. Then, $d(t')=0$ at $t'=d_f/(d_f-d_b)$. In many cases, this starting point may be used as the point of intersection because the error from the actual intersection point can be small. From the parameter $t'$, the ray parameter $t_s$ at the point of intersection can be determined by $t_s=t_f+t'(t_b-t_f)$.

As described above, the ray parameter at the ray/surface intersection $t_s$ is the depth of the surface in window coordinates. For correct occlusion of the contributions of each of the surface cells, the z-buffer is used for depth testing 360. The parameter $t_s$ is compared to the depth value, $z(x_w, y_w)$ stored in the z-buffer for the image sample. If $t_s>z(x_w, y_w)$, then the current ray/surface intersection point is occluded by a previous surface cell. Therefore, no further processing is required.

If the current intersection point passes the z-test, then processing proceeds to lighting calculations 380. From the ray coordinate of the intersection point, the intersection point in cell coordinates is determined by $R_s=R_f+t'(R_b-R_f)$. For conventional Phong shading, the surface normal vector, N, is determined at the intersection point, $R_s$, from the reconstruction kernel. The lighting calculation is then performed conventionally.

Fixing Cracks

Figure 8:
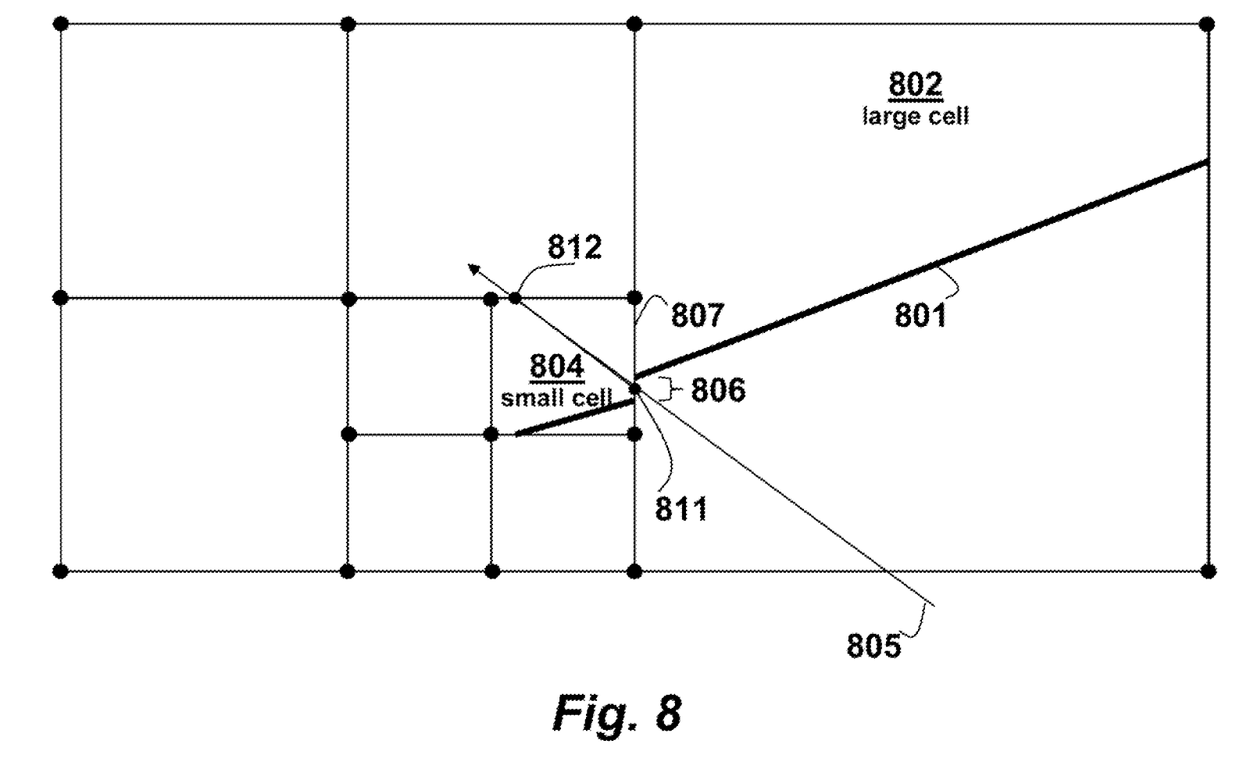
FIG. 8 is a schematic of an ADF including a crack to be corrected according to an embodiment of the invention.

Some distance field rendering methods produce image artifacts that appear as 'cracks' in the output image. Cracks occur because adjacent surface cells can have different sizes leading to slightly different surface locations reconstructed from the distance field samples. For example as shown in FIG. 8, a portion 801 of the surface within a large cell 802 is reconstructed at a slightly different location than a portion 802 within a small cell 804 so that a ray 805 passes through a crack 806.

Our rendering method provides a very elegant and efficient means for eliminating such cracks. We determine, using the distance field, if an entry point 611 where the ray enters the surface cell and an exit point 812 where the ray exits the surface cell are both inside the surface for the portion of the surface in the cell, and if true, the contribution to the image is determined from the entry point of the ray.

Specifically for rays that intersect the bounding box of the surface cell and that are completely inside the surface of the object, as is the case for ray 805 in the small cell 804, we first set $t'=0$, and then continue processing the ray as though the ray has intersected the surface. This has the effect of rendering the front 807 of the bounding box in these areas as though it were part of the surface. Although this is an approximate surface, the image samples in this area are inside of the correct surface so that most image samples from the approximate surface either fail the z-test or are later overwritten by the correct surface from adjacent cells, except in those areas where cracks would otherwise occur.

The surface normal determined from the reconstruction kernel for the approximate surface points in the same direction as the normal, of the correct surface so that surface lighting artifacts in the fixed area are avoided. This procedure eliminates cracks in the output image.

It should be understood that the surface described by the distance field is actually continuous in space and has no cracks or holes. Any cracks that appear in the rendered images are artifacts of the rendering process.

The method of rendering spatially partitioned distance fields can be performed on different computing systems. The method can be written in general purpose programming language, such as C or C++, and compiled to run on a general purpose CPU. Alternately, the method can be written in a combination of a general purpose programming language and a special purpose graphics programming language, such as the OpenGL shader language, and run on a combination of CPU and a graphics processing unit (GPU). Alternately, some other specialized processor may be employed such as a custom application specific integrated circuit (ASIC) or a field programmable gate array (FPGA). The method can be stored on a computer readable medium.

Simulation Applications

As shown in FIG. 9, the method as described above can be used in a system for simulating the operation of a machine tool 910 that remove material from a manufactured object 901. Conventional machining includes a collection of material-working processes wherein power-driven machine tools, such as lathes, milling machines, and drill presses are used with a sharp cutting tool 920 to mechanically cut the material to achieve a desired geometry, for example the geometry of the object 101 according to the 3D model 111.

Most modern machine tools use computer numerical control (CNC), where a computer-implemented controller executes a program, e.g., G-code 902, to drive the machine tool. Very high-precision machine tools are usually set up to remove less than about 0.003 mm of material per pass of the tool. Obviously, it is impossible for the machine operator to observe such small changes. Therefore, there is a need to simulate 920 the operation of the tool 901. During the simulation 920, the rendering method described in this invention enables the operator to visually identify mistakes in the machining process before the part is actually machined.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for rendering a 3D model of a 3D object as an image including image samples, wherein the 3D model is a distance field, and the distance field includes surface cells representing portions of a surface of the 3D object, comprising the steps of:
   determining, in an object-order phase for each surface cell, a set of image samples in the image;
   processing each surface cell, independent of other surface cells, wherein the processing of each surface cell further comprises:
      casting a ray, in an image order phase from each image sample in the set of image samples, through the surface cell to determine a contribution of the surface cell to the image sample, wherein the casting determines, using the distance field, if an entry point where the ray enters the surface cell and an exit point where the ray exits the surface cell are both inside the surface, and if true, the contribution is determined from the entry point; and
   rendering the image, wherein steps of the method are performed by a processor.

2. The method of claim 1, wherein the surface cell has a bounding box, and the determining further comprises:
   projecting the bounding box onto the image to determine the set of image samples.

3. The method of claim 1, wherein the image samples have a different resolution than pixels in the image that is rendered.

4. The method of claim 1, wherein the distance field includes distance field samples., and further comprising:
   reconstructing the distances from the distance field samples using a continuous function.

5. The method of claim 4, wherein the distance field samples are signed, and a change of the sign of the distance field samples of two adjacent vertices of the surface cell indicates that the portion of the surface intersects an edge of the surface cell between the two adjacent vertices at a point of intersection.

6. The method of claim 5, wherein the method includes cell coordinates, model coordinates, eye coordinates, clip coordinates, and window coordinates, and further comprising:
   locating a minimum and maximum of the point an intersection using the window coordinates.

7. The method of claim 6, further comprising:
   transforming the cell coordinates to the window coordinates, via, the model coordinates, the eye coordinates, and clip coordinates using a set of transformation matrices;
   transforming the coordinates of he point of intersection to the clip coordinates; and
   comparing the coordinates of the point of intersection with a range [−1, 1] to determine if the portion of the surface is visible.

8. The method of claim 5, further comprising:
   reconstructing the distance field at the point of intersection.

9. The method of claim 1, further comprising:
   projecting the surface cell to the set of pixels using window coordinates.

10. The method of claim 9, further comprising:
    transforming parameters of the rays ray parameters from window coordinates to cell coordinates.

11. The method of claim 1, further comprising:
    combining the contributions using a depth buffer.

12. The method of claim 1, wherein each surface cell is processed only once for the determining and casting steps.

13. The method of claim 1, wherein the image is super-sampled.

14. The method of claim 1, wherein the image is sub-sampled.

15. The method of claim 1, wherein the method uses cell coordinates, model coordinates, eye coordinates, clip coordinates, and window coordinates.

16. The method of claim 15, further comprising:
    transforming the cell coordinates to the window coordinates, via the model coordinates, the eye coordinates, and clip coordinates using a set of transformation matrices.

17. The method of claim 16, in which a cell matrix $$C = \begin{pmatrix} C_S & 0 & 0 & C_{Ox} \\ 0 & C_S & 0 & C_{Oy} \\ 0 & 0 & C_S & C_{Oz} \\ 0 & 0 & 0 & 1 \end{pmatrix},$$

is used to transform the cells coordinates to the model coordinates, where $C_S$ is size of the surface cell, and $C_O$ are coordinates of an origin of the surface cell in the model coordinates.

18. The method of claim 16, wherein the eye coordinates are transformed to the clip coordinates by a projection matrix using a size of a viewing frustrum.

19. The method of claim 18, wherein the projection matrix represents an orthographic projection.

20. The method of claim 18, wherein the projection matrix represents a perspective projection.

21. The method of claim 16, wherein the clip coordinates of visible portions of the object lie in a unit cube (−1, −1, −1) to (1, 1, 1).

22. The method of claim 21, wherein the visible portions are determined using normals of the surface cells.

23. The method of claim 22, further comprising:
transforming coordinates of the normals from the object coordinates to the eye coordinates by multiplication with a transposed inverse of a modelview transformation.

24. The method of claim 16, wherein the clip coordinates are transformed to the window coordinates by the viewport matrix, which depends on a size of the image.

25. The method of claim 16, in which the transforming is linear.

26. The method of claim 16, in which the transforming is non-linear.

27. The method of claim 1, wherein the distance field includes distance field samples, and further comprising:
reconstructing the distances from the distance field using a tri-linear reconstruction.

28. The method of claim 1, wherein the distance field includes distance field samples, and further comprising:
reconstructing the distances from the distance field using a tri-quadratic reconstruction.

29. The method of claim 1, wherein the rendering is to an output device.

30. The method of claim 1, wherein the rendering is to a memory.

31. The method of claim 1, further comprising:
determining a set of intersections between the surface and edges of the surface cell;
projecting the set of intersections onto the image to determine the set of image samples.

32. The method of claim 1, further comprising:
adding adjacent image samples to the set of image samples as long as the rays cast from the adjacent image samples intersect the surface.

33. A system for rendering a 3D model of a 3D object as an image including image samples, wherein the 3D model is a distance field, and the distance field includes surface cells representing portions of a surface of the 3D object, comprising:
a machine tool implemented in a hardware processor, and comprising:
means for determining, in an object-order phase for each surface cell, a set of image samples in the image;
means for processing each surface cell, independent of other surface cells, wherein the processing of each surface cell further comprises:
means for casting a ray, in an image order phase and from each image sample in the set of image samples, through the surface cell to determine a contribution of the surface cell to the image sample,
wherein the contribution of the ray having both an entry point and an exit point in the surface cell inside the surface is determined from the entry point; and
means for rendering the image.

34. The system of claim 33, wherein the 3D model is generated using computer aided design techniques, and the 3D object is a machined part.

35. The system of claim 33, wherein the means rendering simulates a machining of the object by a machine tool.

36. The system of claim 35, wherein the machine tool is a milling machine.

37. The system of claim 35, in which the machine tool provides feedback for the simulating.

* * * * *